(12) United States Patent
Wang et al.

(10) Patent No.: US 7,811,685 B2
(45) Date of Patent: *Oct. 12, 2010

(54) SILOXANE POLYMERIZATION IN WALLBOARD

(75) Inventors: Xuming Wang, Mundelein, IL (US); Qingxia Liu, Vernon Hills, IL (US); Paul Reed, Kankakee, IL (US); Qiang Yu, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/617,114

(22) Filed: Nov. 12, 2009

(65) Prior Publication Data

US 2010/0055477 A1    Mar. 4, 2010

Related U.S. Application Data

(62) Division of application No. 11/192,652, filed on Jul. 29, 2005.

(51) Int. Cl.
*B32B 13/00*    (2006.01)

(52) U.S. Cl. .................. 428/703; 442/386; 52/309.17; 106/772; 106/778

(58) Field of Classification Search ................. 428/703; 442/386; 52/309.17; 106/772, 778
See application file for complete search history.

(56) References Cited

U.S. PATENT DOCUMENTS

| | | | |
|---|---|---|---|
| 2,127,952 A | 8/1938 | Choate | |
| 2,198,776 A | 4/1940 | King et al. | |
| 3,455,710 A | 7/1969 | Nitzsche et al. | |
| 3,935,021 A | 1/1976 | Greve et al. | |
| 4,350,533 A | 9/1982 | Galer et al. | |
| 4,411,701 A | 10/1983 | Saito et al. | |
| 4,411,702 A | 10/1983 | Makino et al. | |
| 4,486,476 A | 12/1984 | Fritsch et al. | |
| 4,618,642 A | 10/1986 | Schoenherr | |
| 4,643,771 A | 2/1987 | Steinbach et al. | |
| 4,647,496 A | 3/1987 | Lehnert et al. | |
| 4,975,122 A | 12/1990 | Parkinson et al. | |
| 5,135,805 A | 8/1992 | Sellers et al. | |
| 5,220,762 A | 6/1993 | Lehnert et al. | |
| 5,366,810 A | 11/1994 | Merrifield et al. | |
| 5,626,668 A | 5/1997 | Gerhardinger et al. | |
| 5,683,635 A | 11/1997 | Sucech et al. | |
| 5,817,262 A | 10/1998 | Englert | |
| 6,106,607 A | 8/2000 | Be et al. | |
| 6,569,541 B1 | 5/2003 | Martin et al. | |
| 2006/0035112 A1 | 2/2006 | Veeramasuneni et al. | |
| 2009/0239087 A1* | 9/2009 | Wang et al. ................. | 428/447 |

FOREIGN PATENT DOCUMENTS

JP      09-142915      6/1997

* cited by examiner

*Primary Examiner*—Paul Marcantoni
(74) *Attorney, Agent, or Firm*—Greer, Burns & Crain, Ltd.; Philip T. Petti, Esq.; David F. Janci, Esq.

(57) ABSTRACT

Polymerization of siloxane is improved using a gypsum-based slurry that includes stucco, Class C fly ash, magnesium oxide and an emulsion of siloxane and water. This slurry is used in a method of making water-resistant gypsum articles that includes making an emulsion of siloxane and water, then combining the slurry with a dry mixture of stucco, magnesium oxide and Class C fly ash. The slurry is then shaped as desired and the stucco is allowed to set and the siloxane polymerizes.

The resulting product is useful for making a water-resistant gypsum panel having a core that includes interwoven matrices of calcium sulfate dihydrate crystals and a silicone resin, where the interwoven matrices have dispersed throughout them a catalyst comprising magnesium oxide and components from a Class C fly ash.

10 Claims, No Drawings

SILOXANE POLYMERIZATION IN WALLBOARD

PRIORITY CLAIM

This application is a divisional of U.S. Patent application Ser. No. 11/192,652, filed on Jul. 29, 2005.

BACKGROUND OF THE INVENTION

This invention relates to a method for making water resistant gypsum products that include siloxane. More specifically, the present invention relates to the addition of a novel catalyst for curing of the siloxane in a gypsum product.

Gypsum-based building products are commonly used in construction. Wallboard made of gypsum is fire retardant and can be used in the construction of walls of almost any shape. It is used primarily as an interior wall and ceiling product. Gypsum has sound-deadening properties. It is relatively easily patched or replaced if it becomes damaged. There are a variety of decorative finishes that can be applied to the wallboard, including paint and wallpaper. Even with all of these advantages, it is still a relatively inexpensive building material.

Gypsum is also known as calcium sulfate dihydrate, terra alba or landplaster. Plaster of Paris is also known as calcined gypsum, stucco, calcium sulfate semihydrate, calcium sulfate half-hydrate or calcium sulfate hemihydrate. Synthetic gypsum, which is a byproduct of flue gas desulfurization processes from power plants, may also be used. When it is mined, raw gypsum is generally found in the dihydrate form. In this form, there are approximately two water molecules of water associated with each molecule of calcium sulfate.

In order to produce the hemihydrate form, the gypsum can be calcined to drive off some of the water of hydration by the following equation:

$$CaSO_4 \cdot 2H_2O \rightarrow CaSO_4 \cdot \tfrac{1}{2}H_2O + \tfrac{3}{2}H_2O$$

A number of useful gypsum products can be made by mixing the stucco with water and permitting it to set by allowing the calcium sulfate hemihydrate to react with water to convert the hemihydrate into a matrix of interlocking calcium sulfate dihydrate crystals. As the matrix forms, the product slurry becomes firm and holds a desired shape. Excess water must then be removed from the product by drying.

In the absence of additives to prevent it, set gypsum absorbs up to 50% of its weight when immersed in water. Boards or panels that absorb water swell, become deformed and lose strength. This property is undesirable in products that are likely to be exposed to water. In areas such as bathrooms or kitchens, high temperature and humidity are common, and walls are likely to be splashed. In such areas, it is preferable to use a gypsum board that exhibits water resistancy, thus maintaining strength and dimensional stability.

Many attempts have been made to improve the water resistance of gypsum products. Various hydrocarbons, including wax, resins and asphalt have been added to the slurry in order to impart water resistance to the set product. The use of siloxanes, which form silicone resins in gypsum products, to impart water resistance is well known.

Although the use of siloxanes in gypsum slurries is a useful means of imparting water resistance to the finished product, there are drawbacks associated with it. When added to a gypsum slurry to form silicone resins in situ, siloxane can be slow to cure. The siloxane forms a reactive silanol intermediate to yield polymethylsilicic acid, which cross links to form the silicone resin. The reaction proceeds slowly, often continuing after the gypsum is set and requiring one to two weeks to fully develop water-resistance. Wallboard made using this method must be stored for a time sufficient for the water-resistance to develop before the board can be shipped. In some cases, the siloxane may not cure within a reasonable time or it may not cure fully. In such cases, the water resistance does not develop in the gypsum board to a satisfactory level. Additionally, failure to cure fully leads to using a larger dose of the siloxane, increasing the cost of the raw materials.

Catalysts, such as alkaline earth oxides and hydroxides, are known to accelerate the curing reaction of siloxane in a stucco slurry. These catalysts are relatively water soluble and elevate the pH of the slurry. High pH can interfere with the rehydration of the stucco, and can negatively react with some preferred wallboard additives. Thus, while the siloxane polymerization is promoted, other considerations make the use of these catalysts undesirable.

Magnesium oxide ("MgO") is known to catalyze siloxane reactions, but where the catalyst reactivity is high enough to fully cure the siloxane, undesirable cracking results. Light-burned MgO has the activity needed to cure siloxane quickly, but the activity leads to unwanted side reactions. These side reactions generate hydrogen, which cause expansion of the product and cracking of set gypsum. Hard-burned or dead-burned MgO has lower reactivity, but results in a less water-resistant product. Thus, when MgO is used alone, it is very difficult to balance catalyst activity with the desired extent of siloxane polymerization.

There are also certain stucco sources for which it is very difficult to drive the polymerization of siloxane. Gypsum is a complex mixture of calcium sulfate in various forms, salts and a variety of aluminates, silicates and aluminosilicates. Apparently some gypsum sources include one or more components that suppress the formation of the silicone resin. When used with these stuccos, known catalysts fall short of the desired level of water-resistance of less than 5% water absorbance.

Thus there is a need in the art for a catalyst and a method of producing water-resistant gypsum articles with improved water-resistance at reasonable cost. The catalyst should be relatively inexpensive, having good activity for siloxane polymerization with a minimum of unwanted side reactions. There should be little interference between the catalyst and other common gypsum additives.

SUMMARY OF THE INVENTION

These and other needs are met or exceeded by the present invention which accelerates the polymerization of siloxane and in some cases reduces the amount of siloxane needed to meet the specifications of ASTM 1398.

More specifically, polymerization of siloxane is improved using a slurry that includes stucco, Class C fly ash, magnesium oxide and an emulsion of siloxane and water. This slurry is used in a method of making water-resistant gypsum articles that includes making an emulsion of siloxane and water, then combining the slurry with a dry mixture of stucco, magnesium oxide and Class C fly ash. The slurry is then shaped as desired and the stucco is allowed to set and the siloxane polymerizes.

The resulting product is useful for making a water-resistant gypsum panel having a core that includes interwoven matrices of calcium sulfate dihydrate crystals and a silicone resin, where the interwoven matrices have dispersed throughout them a catalyst comprising magnesium oxide and components from a Class C fly ash.

The mixture of magnesium oxide and Class C fly ash catalyzes the polymerization of siloxane to accelerates development of water-resistance in product made from the slurry. Water-resistant products such as wallboard need not be stored for lengthy periods of time awaiting completion of the polymerization reactions of the siloxane.

Use of this catalyst also increases the extent of the reaction, leading to improved water-resistance. Water absorption of less than 5% by weight was attainable using the fly ash and magnesia combination, where it had not been achieved with either catalyst alone. Thus, in addition to causing the polymerization reaction to accelerate, this catalyst also allows the siloxane to polymerize more completely allowing the amount of siloxane to be reduced in some cases. Since the siloxane is one of the more expensive wallboard additives, reduction in the dosage leads to a savings in the cost of the raw materials.

Another advantage of the present invention is the dimensional stability of the product. Some compounds used to catalyze this reaction result in significant expansion as the product dries. As the board interior expands, it causes cracking in the exterior board surface, damaging it. Use of fly ash and magnesium oxide results in very little expansion and very little cracking in the finished product.

This combined fly ash and magnesia catalyst also allows for satisfactory polymerization using a wider range of magnesium oxide grades. While the prior art discloses only that dead-burned magnesia is suitable to act as a catalyst for siloxane polymerization, when combined with fly ash, even hard-burned or light-burned magnesium oxide may be used. This feature allows manufacturers of gypsum products additional freedom in selection sources of magnesium oxide to be used in the slurry.

DETAILED DESCRIPTION OF THE INVENTION

The present invention broadly contemplates improving the water resistance of gypsum based articles by adding a polymerizable siloxane to the slurry used to make the gypsum based articles. Preferably, the siloxane is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin is added to the gypsum slurry.

Preferably, the siloxane is generally a fluid linear hydrogen-modified siloxane, but can also be a cyclic hydrogen-modified siloxane. Such siloxanes are capable of forming highly cross-linked silicone resins. Such fluids are well known to those of ordinary skill in the art and are commercially available and are described in the patent literature. Typically, the linear hydrogen modified siloxanes useful in the practice of the present invention comprise those having a repeating unit of the general formula:

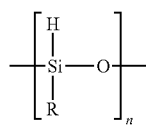

wherein R represents a saturated or unsaturated monovalent hydrocarbon radical. In the preferred embodiments, R represents an alkyl group and most preferably R is a methyl group. During polymerization, the terminal groups are removed by condensation and siloxane groups are linked together to form the silicone resin. Cross-linking of the chains also occurs. The resulting silicone resin imparts water resistance to the gypsum matrix as it forms.

The gypsum-based water resistant articles of the present invention are preferably made with a solventless methyl hydrogen siloxane fluid sold under the name SILRES BS 94 by Wacker-Chemie GmbH (Munich, Germany) as the siloxane. The manufacturer indicates this product is a siloxane fluid containing no water or solvents. It is contemplated that about 0.3 to 1.0% of the BS 94 siloxane may be used, based on the weight of the dry ingredients. It is preferred to use from about 0.4 to about 0.8% of the siloxane based on the dry stucco weight.

After the slurry is formed, the siloxane is formed into an emulsion or a stable suspension with water. A number of siloxane emulsions are contemplated for use in this slurry. Emulsions of siloxane in water are also available for purchase, but they may include emulsifying agents that tend to modify properties of the gypsum articles, such as the paper bond in wallboard products. Emulsions or stable suspensions prepared without the use of emulsifiers are therefore preferred. Preferably, a suspension is formed in situ by mixing the siloxane fluid with water. It is essential that the siloxane suspension be stable until it reaches the pin mixer and that it remain well dispersed under the conditions of the slurry. The siloxane suspension or emulsion must remain well dispersed in the presence of the optional additives, such as set accelerators, that are present in the slurry. The siloxane suspension or emulsion must also remain stable through the steps in which the gypsum based articles are formed as well. Preferably, the suspension remains stable for more than 40 minutes. More preferably, it remains stable for at least one hour. In the discussion and claims that follow, the term "emulsion" is intended to include true emulsions and suspensions that are stable at least until the stucco is 50% set.

In a preferred embodiment, at least a portion of the gauging water is continuously fed to the high shear mixer. Siloxane fluid is metered into the high shear mixer with the water to form the emulsion in 1-2 seconds. The proportion of water to siloxane is not critical and a mixture of 25 parts water to one part siloxane is known to be useful. This emulsion is stable for several minutes without the addition of an emulsifier, long enough to mix the slurry, form the article and allow it to start to set. In the alternative, use of a portion of the gauging water to form the emulsion is also contemplated. A slip stream of the gauging water is combined with the siloxane in the high shear mixer. The siloxane emulsion is then preferably added to the gauging water before the slurry is formed to provide sufficient time for the siloxane emulsion to thoroughly mix with water used to form the slurry and be uniformly dispersed throughout the resulting articles.

While not wishing to be bound by theory, it is believed that water resistance develops when the siloxane cures within the formed wallboard. The polymerization reaction proceeds slowly on its own, requiring that the wallboard be stored for a time sufficient to develop water-resistance prior to shipping. Catalysts are known to accelerate the polymerization reaction, reducing or eliminating the time needed to store wallboard product as the water-resistance develops. Use of dead-burned magnesium oxide for siloxane polymerization is described in co-pending U.S. Ser. No. 10/917,177, entitled "Method of Making Water-Resistant Gypsum-Based Article", herein incorporated by reference. Dead-burned magnesium oxide is water-insoluble and interacts less with other components of the slurry. It accelerates curing of the siloxane and, in some cases, causes the siloxane to cure more completely. It is commercially available with a consistent composition. A particularly preferred source of dead-burned magnesium oxide is BAYMAG 96. It has a BET surface area of at least 0.3 m²/g. The loss on ignition is less than 0.1% by weight. The magnesium oxide is preferably used in amounts of about 0.1 to about 0.5% based on the dry stucco weight.

There are at least three grades of magnesium oxide on the market, depending on the calcination temperature. "Deadburned" magnesium oxide is calcined between 1500° C. and 2000° C., eliminating most, if not all, of the reactivity. MagChem P98-PV (Martin Marietta Magnesia Specialties, Bethesda, Md.) is an example of a "dead burned" magnesium oxide. BayMag 96 (Baymag, Inc. of Calgary, Alberta, Canada) and MagChem 10 (Martin Marietta Magnesia Specialties, Bethesda, Md.) are examples of "hard-burned" magnesia. "Hard-burned" magnesium oxide is calcined at temperatures from 1000° C. to about 1500° C. It has a narrow range of reactivity, a high density, and is normally used in application where slow degradation or chemical reactivity is required, such as in animal feed and fertilizer. The third grade is "light-burn" or "caustic" magnesia, produced by calcining at temperatures of about 700° C. to about 1000° C. This type of magnesia is used in a wide range of applications, including plastics, rubber, paper and pulp processing, steel boiler additives, adhesives and acid neutralization. Examples of light burned magnesia include BayMag 30, BayMag 40, and BayMag 30 (−325 Mesh) (BayMag, Inc. of Calgary, Alberta, Canada).

It has been discovered that preferred catalysts are made of a mixture of magnesium oxide and Class C fly ash. When combined in this manner, any of the grades of magnesium oxide are useful. However, dead-burned and hard-burned magnesium oxides are preferred due to reduced reactivity. The relatively high reactivity of magnesium oxides, can lead to cracking reactions which can produce hydrogen. As the hydrogen is generated, the product expands, causing cracks where the stucco has set. Expansion also causes breakdown of molds into which the stucco is poured, resulting in loss of detail and deformation of the product in one or more dimensions. Preferably, BayMag 96, MagChem P98-PV and MagChem 10 are the preferred sources of magnesium oxide. Preferably, the magnesium oxide and fly ash are added to the stucco prior to their addition to the gauging water. Dry components such as these are often added to the stucco as it moves along a conveyer to the mixer.

A preferred fly ash is a Class C fly ash. Class C hydraulic fly ash, or its equivalent, is the most preferred fly ash component. A typical composition of a Class C fly ash is shown in Table 1. High lime content fly ash, greater than 20% lime by weight, which is obtained from the processing of certain coals. ASTM designation C-618, herein incorporated by reference, describes the characteristics of Class C fly ash. A preferred Class C fly ash is supplied by Bayou Ash Inc., Big Cajun, II, La. Preferably, fly ash is used in amounts of about 0.1% to about 5% based on the dry stucco weight. More preferably, the fly ash is used in amounts of about 0.2% to 1.5% based on the dry stucco weight.

TABLE I

Typical Type C Fly Ash Composition

| Composition | Amount, wt % |
| --- | --- |
| $SiO_2$ | 25-59 |
| $Al_2O_3$ | 14-22 |
| $Fe_2O_3$ | 5-13 |
| CaO | 8-32 |
| MgO | 3.2-12.5 |
| $K_2O$ | 0.3-1.6 |

TABLE I-continued

Typical Type C Fly Ash Composition

| Composition | Amount, wt % |
| --- | --- |
| $Na_2O$ | 0.8-6.0 |
| $SO_3$ | 0.4-5.0 |
| $TiO_2$ | <1.0 |
| Loss On Ignition | 0.1-2.3 |

Catalysis of the siloxane results in faster and more complete polymerization and cross-linking of siloxane to form the silicone resin. Hydration of the stucco forms an interlocking matrix of calcium sulfate dihydrate crystals. While the gypsum matrix is forming, the siloxane molecules are also forming a silicone resin matrix. Since these are formed simultaneously, at least in part, the two matrices become intertwined in each other. Excess water and additives to the slurry, including the fly ash, magnesium oxide and additives described below, which were dispersed throughout the slurry, become dispersed throughout the matrices in the interstitial spaces.

When used to make gypsum board, a number of additives are useful to improve the properties of the finished article. Traditional amounts of additives are used. Except as noted, there are no known interactions of the catalyst or polysiloxane that interferes with the additives. Amounts of several additives are reported as "lbs/MSF," which stands for pounds of additive per one thousand square feet of board.

Some embodiments of the invention employ a foaming agent to yield voids in the set gypsum-containing product to provide lighter weight. In these embodiments, any of the conventional foaming agents known to be useful in preparing foamed set gypsum products can be employed. Many such foaming agents are well known and readily available commercially, e.g. the HYONIC line of soaps from GEO Specialty Chemicals, Ambler, Pa. Foams and a preferred method for preparing foamed gypsum products are disclosed in U.S. Pat. No. 5,683,635, herein incorporated by reference.

Dispersants are used to improve the flowability of the slurry and reduce the amount of water used to make the slurry. Any known dispersant is useful, including polycarboxylates, sulfonated melamines or naphthalene sulfonate. Naphthalene sulfonate is the most preferred dispersant, and is used in amounts of about 0 lb/MSF to 18 lb/MSF, preferably from about 4 lb/MSF to about 12 lb/MSF. A preferred naphthalene sulfonate dispersant is DAXAD Dispersant (Dow Chemical, Midland, Mich.)

Water is added to the slurry in any amount that makes a flowable slurry. The amount of water to be used varies greatly according to the application with which it is being used, the exact dispersant being used, the properties of the stucco and the additives being used. The water to stucco ratio ("WSR") for wallboard is preferably about 0.2 to about 1.2 based on the dry weight of the stucco. Commonly, a WSR of about 0.4 to about 0.9 is preferred. Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The stucco, also known as calcium sulfate hemihydrate or calcined gypsum, is present in amounts of at least 50% of the dry materials. Preferably, the amount of stucco is at least 80%. In many wallboard formulations, the dry component material is more than 90% or even 95% calcium sulfate hemihydrate. The method of calcination is not important, and either alpha or beta-calcined stucco is suitable. Use of calcium sulfate anhydrite is also contemplated, although it is preferably used in small amounts of less than 20%.

A trimetaphosphate compound is added to the gypsum slurry in some embodiments to enhance the strength of the product and to improve sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other modifiers that raise the pH of the slurry. Above a pH of about 9.5, the trimetaphosphate looses its ability to strengthen the product and the slurry becomes severely retardive.

Other additives are also added to the slurry as are typical for the particular application to which the gypsum slurry will be put. Set retarders (up to about 2 lb./MSF (9.8 g/m2)) or dry accelerators (up to about 35 lb./MSF (170 g/m2)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm. Pyrithione is known by several names, including 2-mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). The sodium derivative ($C_5H_4NOSNa$), known as sodium pyrithione (CAS Registry No. 3811-73-2), is one embodiment of this salt that is particularly useful. Pyrithione salts are commercially available from Arch Chemicals, Inc. of Norwalk, Conn., such as Sodium OMADINE or Zinc OMADINE.

In addition, the gypsum composition optionally can include a starch, such as a pregelatinized starch or an acid-modified starch. Starches are used in amounts of from about 3 to about 20 lbs/MSF (14.6 to 97.6 g/m$^2$) to increase paper bond and strengthen product. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 Starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Other known additives may be used as needed to modify specific properties of the product. Sugars, such as dextrose, are used to improve the paper bond at the ends of the boards. Wax emulsions or siloxanes are used for water resistance. If stiffness is needed, boric acid is commonly added. Fire retardancy can be improved by the addition of vermiculite. These and other known additives are useful in the present slurry and wallboard formulations. Glass fibers are optionally added to the slurry in amounts of up to 11 lb./MSF (54 g/m$^2$). Up to 15 lb./MSF (73.2 g/m$^2$) of paper fibers are also added to the slurry. Wax emulsions are added to the gypsum slurry in amounts up to 90 lb./MSF (0.439 kg/m$^2$) to improve the water-resistency of the finished gypsum board panel.

In operation, a slip stream is taken from the gauging water and combined with siloxane and water in a high shear mixer to form the siloxane emulsion. The two components are mixed for several minutes until a stabile emulsion is formed. From the high shear mixer, the emulsion goes directly to the slurry mixer where it is combined with the remainder of the gauging water. Meanwhile, the stucco is moved toward a slurry mixer.

Prior to entry into the mixer, dry additives, such as starches, or set accelerators, are added to the powdered stucco. Some additives are added directly to the mixer via a separate line. For most additives, there is no criticality regarding placing the additives in the slurry, and they may be added using whatever equipment or method is convenient.

After mixing, wallboard optionally has foam added to decrease the product density. Foam is generated by combining soap and water. The foam is then injected into the moving gypsum slurry after it exits from the mixer through a hose or chute. The foam ring is an apparatus having multiple ports that are arranged in a ring perpendicular to the axis of the hose so that foam is forced under pressure into the gypsum slurry as it passes by the foam ring.

When the foam and the slurry have been brought together, the resulting slurry moves toward and is poured onto a conveyor lined with one piece of facing material. Another piece of facing material is placed on top of the slurry, forming a sandwich with the slurry between the two facing materials. The sandwich is fed to a forming plate, the height of which determines the thickness of the board. Next the continuous sandwich is cut into appropriate lengths at the cutting knife, usually eight feet to twelve feet.

The boards are then moved to a kiln for drying. Temperatures in the kiln typically range to 450° F. to 500° F. maximum. Preferably there are three or more temperature zones in the kiln. In the first zone contacted by the wet board, the temperature increases to the maximum temperature, while the temperature slowly decreases in the last two zones. The blower for the first zone is positioned at the exit of the zone, blowing the air countercurrent to the direction of board travel. In the second and third zones, the blowers are located at the entrance to the zone, directing the hot air co-current with board travel. Heating that is less severe in the last zone prevents calcination of dry areas of the board, causing poor paper bond. A typical residence time in the kiln is about forty minutes, but the time will vary depending on the line capacity, the wetness of the board and other factors.

EXAMPLE 1

Two grams of BAYMAG 30 dead-burned magnesium oxide and 4 grams of Class C fly ash were added to 500 grams of stucco from each of several sources specified in Table II. These dry components were placed in a plastic bag and shaken to mix them. An emulsion was prepared by mixing 3.2 grams of BS 94 siloxane and 550 grams of water for 2.5 minutes in a high shear Silverson Mixer (Silverson Machines, East Longmeadow, Mass.). The emulsion was transferred to a 1 liter Waring blender at 7500 rpm (Waring Products, Inc., Torrington, Conn.) for 10 seconds. The slurry was then cast into a 2"×2"×2" cube mold. After set, the cubes were unmolded and placed in an oven for drying to a constant weight at 110° F. Dried cubes were soaked in water for two hours for the water absorption test as specified in ASTM C1396, herein incorporated by reference. The weight gain during the soaking was used to calculate the water absorption.

TABLE II

| Stucco Source | Dry Density | Dry Weight | Wet Weight | Water Pickup | % Absorption |
| --- | --- | --- | --- | --- | --- |
| Empire | 43.0 | 90.27 | 93.44 | 3.17 | 3.5 |
| " | 42.6 | 89.5 | 92.8 | 3.31 | 3.7 |
| " | 42.8 | 89.8 | 93.1 | 3.29 | 3.7 |
| Montreal | 43.4 | 91.26 | 93.71 | 2.45 | 2.7 |
| " | 43.5 | 91.38 | 93.97 | 2.59 | 2.8 |
| " | 43.3 | 91.1 | 93.5 | 2.46 | 2.7 |
| Sperry | 42.8 | 89.89 | 93.89 | 4.0 | 4.4 |
| " | 42.5 | 89.4 | 92.9 | 3.55 | 4.0 |
| " | 42.6 | 89.6 | 93.3 | 3.74 | 4.2 |
| Sweet Water | 43.8 | 92.09 | 96.51 | 4.42 | 4.8 |
| " | 43.5 | 91.4 | 95.6 | 4.12 | 4.5 |
| " | 43.7 | 91.8 | 96.1 | 4.31 | 4.7 |

This example demonstrates the ability of this catalyst combination to reduce water absorption to less than 5% in a variety of stuccos.

EXAMPLE 2

Commercial scale trials where held to test the behavior of a slurry including 12 lb/MSF siloxane, and having magnesium oxide and fly ash as indicated in Table III. The fly ash and magnesium oxide were added to the stucco prior to entering the mixer. The brand and type of calcined magnesium oxide is also shown in Table III.

Siloxane was added to the gauging water and mixed in a high shear mixer to form an emulsion. This emulsion and the dry components were combined in the stucco mixer until a homogeneous slurry was formed, and the slurry was deposited on a face paper on a conveyor. Backing paper was placed atop the slurry and the sandwich was fed to a forming roller that flattened the sandwich to a uniform ½ inch (1.2 cm) thickness. When the slurry was sufficiently set to hold its shape, the continuous board was cut into 8-foot lengths.

TABLE III

| Trial Condition | | | Trial Board |
| --- | --- | --- | --- |
| MgO Source | MgO Amount | Flyash Amount | 2 Hr. Absorption |
| Baymag 96 | 4 | 0 | 5.3% |
| " | 4 | 0 | 5.9% |
| " | 4 | 0 | 4.4% |
| " | 4 | 0 | 5.4% |
| " | 4 | 0 | 5.8% |
| MagChem 10 | 4 | 0 | 5.2% |
| " | 4 | 0 | 5.2% |
| " | 4 | 0 | 5.5% |
| " | 4 | 0 | 5.7% |
| " | 4 | 0 | 5.7% |
| " | 4 | 10 | 4.3% |
| " | 4 | 10 | 4.6% |
| " | 4 | 10 | 4.3% |
| " | 4 | 10 | 3.9% |
| " | 4 | 10 | 4.5% |
| Baymag 30 | 3 | 10 | 4.4% |
| " | 3 | 10 | 4.4% |
| " | 3 | 10 | 4.6% |
| " | 3 | 10 | 4.6% |
| " | 3 | 10 | 4.4% |
| " | 3 | 0 | 5.7% |
| " | 3 | 0 | 5.8% |
| " | 4 | 0 | 5.6% |
| " | 4 | 0 | 6.2% |
| " | 4 | 0 | 5.8% |
| " | 4 | 0 | 7.1% |

When fly ash was added to MagChem 10 dead-burned magnesium oxide, the water resistance improved more than 25%. The same comparison holds when the same amount of fly ash was added to 3 lb/MSF of BayMag 30. The combination of fly ash with 3 lb/MSF BayMag 30 also performs better than 4 lb/MSF of BayMag 30 alone.

EXAMPLE 3

Cubes were made according to Example 1 using Shoals stucco and 0.6 wt % BS 94 siloxane. Either Baymag 30 magnesium oxide, fly ash or both was added to the slurry as indicated in Table IV. The target water adsorption was 6%.

TABLE IV

| Baymag 30 | Fly Ash | Water Adsorption |
| --- | --- | --- |
| 0.4% | 0 | 21.5% |
| 0 | 0.8% | 24% |
| 0.4% | 0.8% | 2.0% |

When magnesium oxide and fly ash are used together, water reduction improved by an order of magnitude in the above example.

EXAMPLE 4

Gypsum cubes were made according to the method of Example 1 using the siloxane dosage and catalyst composition shown in Table 4. Results of water absorption tests are also shown in Table V.

TABLE V

| Stucco Source | Siloxane Dosage | MgO | Fly Ash | Water Absorption |
|---|---|---|---|---|
| Empire | 4.2 g | 1.2 g | 0 | 6.1% |
| " | 4.2 g | 0 | 6.0 g | 32% |
| " | 3.1 g | 1.2 g | 6.0 g | 3.7% |
| Montreal | 4.2 g | 1.2 g | 0 | 7% |
| " | 4.2 g | 0 | 6.0 g | 40% |
| " | 3.1 g | 1.2 g | 6.0 g | 2.9% |

These tests were preformed on stuccos with which it is particularly difficult to obtain satisfactory water resistance. Neither fly ash nor MgO alone were able to produce the desired standard of less than 5% water absorption. However, when both catalysts were used together, absorption well below the standard was achieved, even with a lower dosage of siloxane.

EXAMPLE 5

A plant trial was held testing this catalyst in wallboard on a commercial scale. The composition of the wallboard is shown in Table VI.

TABLE VI

| Component | Amount, lbs/MSF |
|---|---|
| Stucco | 1324 |
| Gauging Water | 546 |
| Siloxane Water | 119 |
| Foam Water | 75 |
| Siloxane | 10.5 |
| MgO | 4 |
| Fly Ash | 10.85 |
| Soap | 0.4 |
| HRA Set Accelerator | 16.6 |
| Trimetaphosphate | 0.8 |
| LC-211 | 3.0 |
| USG 95 Starch | 3.5 |
| Thickener | 0.49 |
| Daxad Dispersant | 5.5 |
| Foam Air | 17 ft$^3$/MSF |

HRA, Trimetaphosphate, USG95, thickener, Daxad, LC-211, Fly ash and MgO were added to the dry stucco. The siloxane water and siloxane were mixed in a high speed mixer at high speed for less than 1 minute to make a stable suspension of siloxane in water. The suspension was then pumped to the slurry mixer and combined with the gauging water, the catalyst/stucco blend. Residence in the mixer was less than 15 seconds. As the slurry was discharged from the mixer, foam, made of the soap, foam air and foam water was inserted into the slurry to reduce the product density.

TABLE VI

| Sample | Water Absorption |
|---|---|
| 1A | 4.11% |
| 1B | 4.36% |
| 2A | 4.34% |
| 2B | 4.37% |
| 3A | 4.19% |
| 4B | 4.06% |

Cubes were made from a slurry sample according to ASTM C1396. Results of the soak tests are shown in Table VI. These tests confirm that wallboard having less than 5% water absorption are producable in a commercial setting using the catalyst, slurry and method of this invention.

While a particular embodiment of the fly ash and magnesium oxide catalyst for siloxane polymerization has been shown and described, it will be appreciated by those skilled in the art that changes and modifications may be made thereto without departing from the invention in its broader aspects and as set forth in the following claims.

What is claimed is:

1. A water-resistant gypsum panel having a core comprising interwoven matrices of calcium sulfate dihydrate crystals and a silicone resin, said interwoven matrices having dispersed throughout them a catalyst comprising magnesium oxide and a Class C fly ash.

2. The panel of claim 1 further comprising at least one of the group consisting of starches, foaming agents, set accelerators, set retarders, biocides, dispersants, fibers or strength enhancers dispersed throughout said interwoven matrices.

3. The panel of claim 1 wherein said core is sandwiched between two pieces of facing material.

4. The panel of claim 1 wherein the ratio of said fly ash to said magnesium oxide is from about 2:1 to about 3:1.

5. The panel of claim 1 wherein said fly ash is present in the slurry in amounts of about 0.1% to about 5.9% based on the calcium sulfate dihydrate weight.

6. The panel of claim 1 wherein said fly ash is present in amounts ranging from about 0.1% to about 5.9% based on the calcium sulfate dihydrate weight.

7. The panel of claim 1 wherein said magnesium oxide is present in amounts of about 0.1 to about 0.5% based on the dry calcium sulfate dihydrate weight.

8. The panel of claim 1 wherein said magnesium oxide is a hard-burned or a dead-burned magnesium oxide.

9. The panel of claim 1 wherein said siloxane is a linear, hydrogen-modified siloxane.

10. The panel of claim 1 further comprising at least one of the group consisting of starches, foaming agents, set accelerators, set retarders, biocides, dispersants, fibers and strength enhancers.

* * * * *